United States Patent [19]

Green

[11] Patent Number: 5,531,031
[45] Date of Patent: Jul. 2, 1996

[54] LASER LEVEL AND SQUARE

[76] Inventor: Kevin D. Green, 7627 E. 21st No. 106, Tulsa, Okla. 74129

[21] Appl. No.: 376,002

[22] Filed: Jan. 20, 1995

[51] Int. Cl.⁶ .............................. G01C 1/00; G01C 15/00
[52] U.S. Cl. .................. 33/365; 33/281; 33/283; 33/286; 33/DIG. 21
[58] Field of Search ............................. 33/365, 263, 281, 33/282, 283, 285, 286, DIG. 1, DIG. 21, 374, 375, 384, 388, 389

[56] References Cited

U.S. PATENT DOCUMENTS

| | | | |
|---|---|---|---|
| 1,657,546 | 1/1928 | Patton | 33/388 |
| 2,695,949 | 11/1954 | Ashwill . | |
| 2,877,555 | 3/1959 | Visockis, Jr. . | |
| 3,820,249 | 6/1974 | Stone | 33/347 |
| 3,897,637 | 8/1975 | Genho | 33/227 |
| 3,909,952 | 10/1975 | Lagasse | 33/283 |
| 4,168,578 | 9/1979 | Vanderwerf | 33/371 |
| 4,590,682 | 5/1986 | Koch | 33/388 |
| 4,852,265 | 8/1989 | Rando et al. | 33/227 |
| 4,912,662 | 3/1990 | Butler et al. | 33/377 |
| 4,912,851 | 4/1990 | Rando et al. | 33/227 |
| 5,103,569 | 4/1992 | Leatherwood | 33/384 |
| 5,121,188 | 6/1992 | Patridge et al. . | |
| 5,394,616 | 3/1995 | Claxton | 33/371 |
| 5,402,226 | 3/1995 | Matthews et al. | 33/285 |

FOREIGN PATENT DOCUMENTS 2157433  10/1985  United Kingdom .................... 33/371

*Primary Examiner*—Christopher W. Fulton
*Attorney, Agent, or Firm*—Craig W. Roddy

[57]  ABSTRACT

A device for leveling and squaring which includes a level body having a spirit vial or electronic inclinometer, wherein a battery powered laser module assembly is rotatably mounted in one end of the level body for emitting a visible laser beam therefrom. The level body contains a transparent window which allows the laser beam to exit therefrom. Further, the level body has a groove parallel the longitudinal axis thereof to provide a horizontal (0°) reference line. Wherefore, the laser beam establishes a precise line, which is variably adjustable from horizontal (0°) to 90° thereto, for alignment and squaring uses. Magnetic strips are used for attaching the level body to ferromagnetic materials.

18 Claims, 5 Drawing Sheets

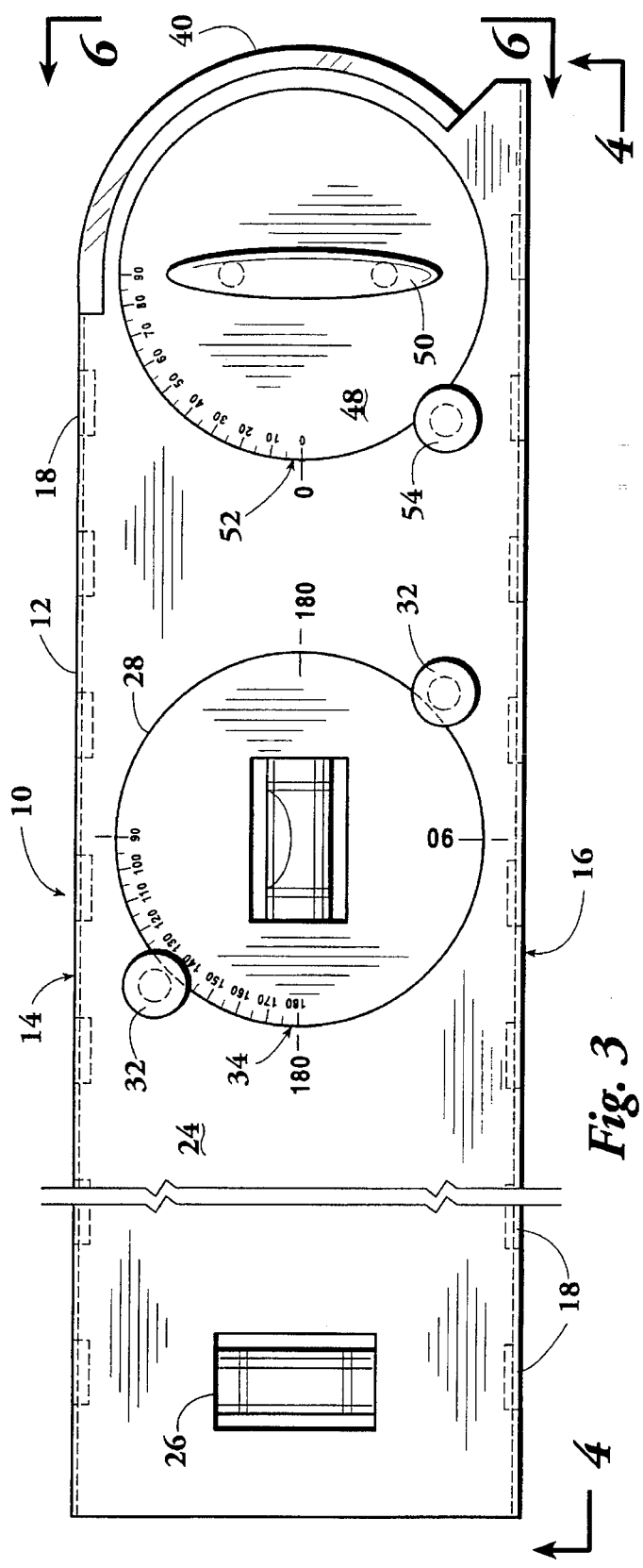
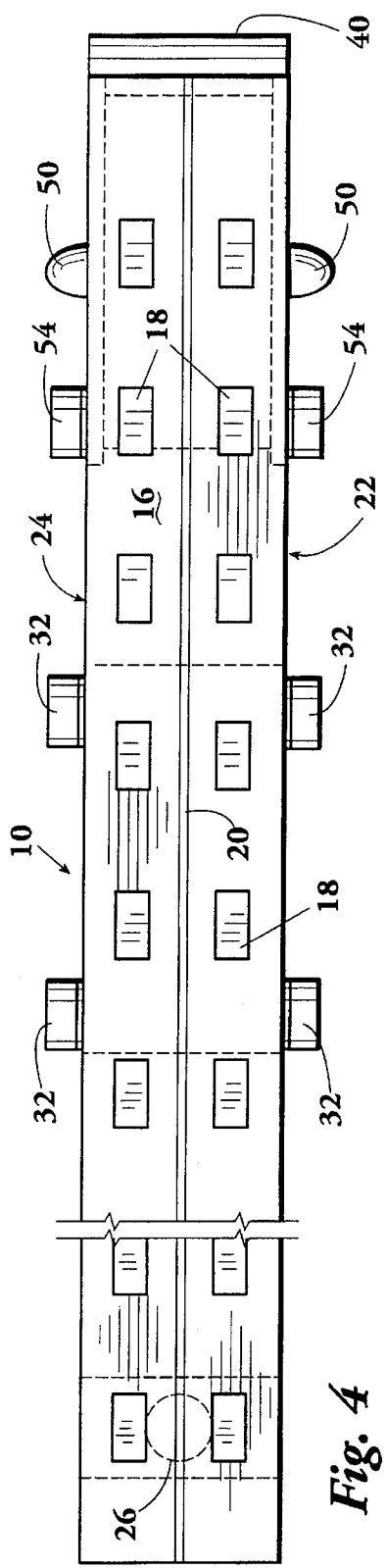
Fig. 3
Fig. 4

LASER LEVEL AND SQUARE

BACKGROUND

The present invention relates generally to a device for use in leveling and squaring, and more particularly, to a level incorporating a laser module assembly which is variably redirected for squaring angles at a distance.

Level and plumb devices having lasers for alignment are known. One level provides two and three simultaneous laser output beams at 90° for leveling or grade along two axes at the same time, and for a level and a vertical at the same time. Another device includes a laser and operable dial, wherein the dial positions reflecting mirrors for selecting between the projection of a vertical laser beam and a horizontal laser beam from the tool.

The known level, plumb or alignment devices only provide laser beams for squaring 90° angles. Nevertheless, the present embodiment of the invention provides a leveling device having a visible laser beam which is variably redirected for squaring angles at a distance.

Because laser levels and squares in the prior art do not provide means for squaring assorted angles at a distance, there is a need for a simple, economical and effective leveling device having a variably adjustable laser; however, until now, no such device has been developed.

SUMMARY

The present embodiment of the invention is directed to a level incorporating a visible laser that is variably redirected for squaring angles at a distance. More specifically, a preferred embodiment of the invention comprises a generally rectangular level body having a leveling means, such as a spirit vial or electronic inclinometer. A battery powered laser module assembly is rotatably mounted in one end of the level body for emitting a visible laser beam therefrom. The level body has a groove parallel the longitudinal axis thereof to provide a reference line for use in alignment. The reference line is termed "horizontal" for descriptive purposes herein and should be read only in conjunction with the embodiment in the orientation illustrated.

A transparent window is joined with the level body for allowing the visible laser beam to exit therefrom. The laser module assembly pivots about a range of at least 90°, wherein the laser beam may be variably redirected and set to any desired angle from horizontal to 90° thereto. In addition, magnetic strips are provided for attaching the level body to ferromagnetic materials.

As such, it is a first object of the embodiment of the invention to provide a device for leveling and squaring which is compact and lightweight.

It is a further object of the embodiment of the invention to provide a device which may be placed at any angle, including but not limited to horizontal, vertical, upside down and sideways, wherein the laser may always be positioned at any variety of angles therefrom.

It is a further object of the embodiment of the invention to provide a device having a visible laser beam for squaring various angles at a distance.

It is a further object of the embodiment of the invention to provide a device having a laser module assembly which is movably mounted therein.

It is a further object of the embodiment of the invention to provide a device having a movable laser module assembly, wherein the emitted laser beam is variably redirected from horizontal (0°) to 90° thereto.

It is a further object of the embodiment of the invention to provide a device having a means for selecting the desired angle to be squared.

It is a further object of the embodiment of the invention to provide a device containing a spirit vial or electronic inclinometer for leveling.

It is a further object of the embodiment of the invention to provide a device having a rectangular shaped inclinometer which is removable from the device for separate use therefrom.

It is a further object of the embodiment of the invention to provide a device having a self-contained laser module assembly.

It is a final object of the embodiment of the invention to provide a simple, economical and effective device for leveling and squaring.

BRIEF DESCRIPTION OF THE DRAWINGS

These and other features, aspects, and advantages of the present invention will become better understood with regard to the following description, appended claims, and accompanying drawings where:

FIG. 3 is a back elevation view of the laser level and square in FIG. 1;

FIG. 4 is a bottom plan view taken along line 4—4 of FIG. 3;

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

Figure 1:
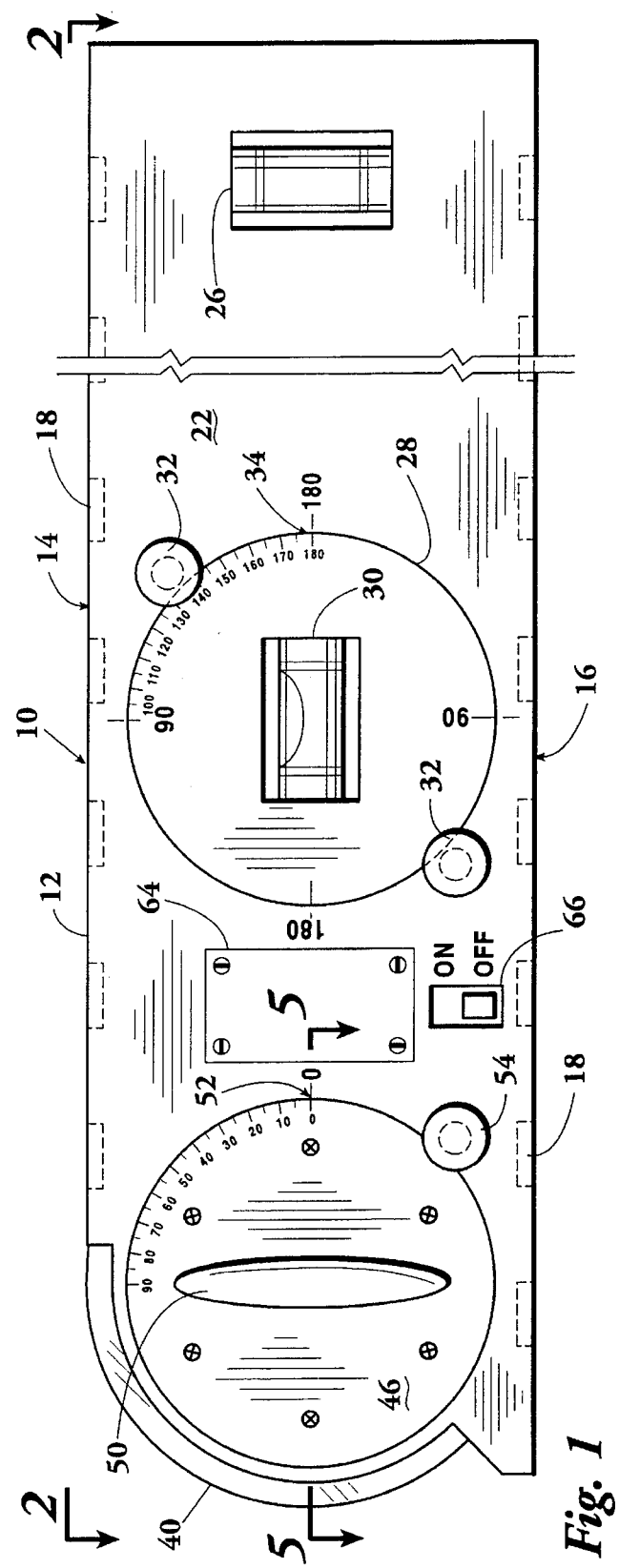
FIG. 1 is a front elevation view of a laser level and square constructed in accordance with the present embodiment of the invention.
Figure 2:
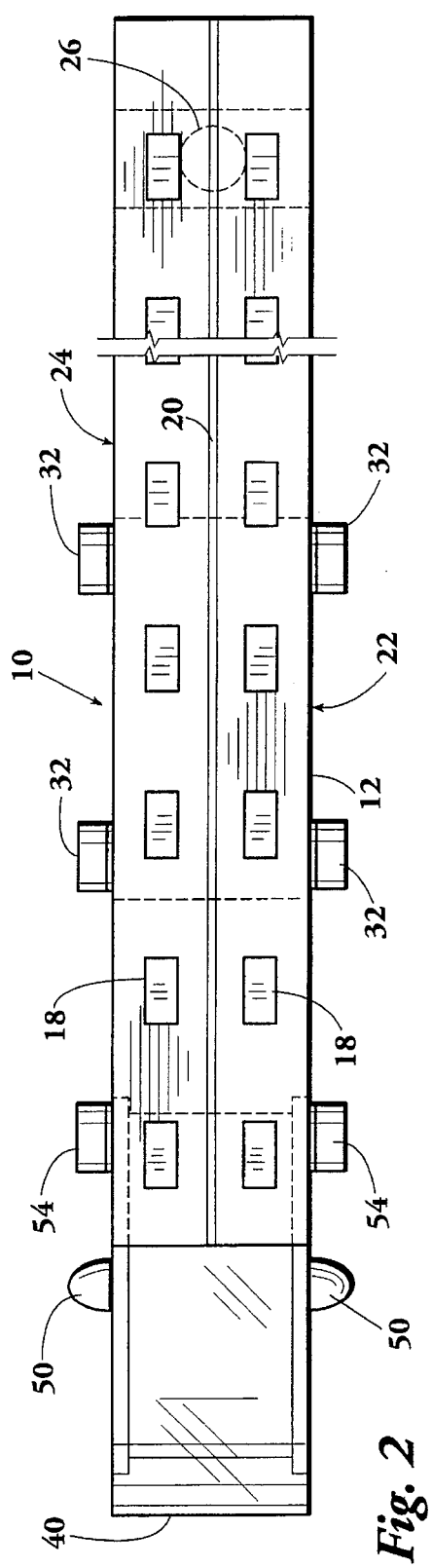
FIG. 2 is a top plan view taken along line 2—2 of FIG. 1.
Figure 5:
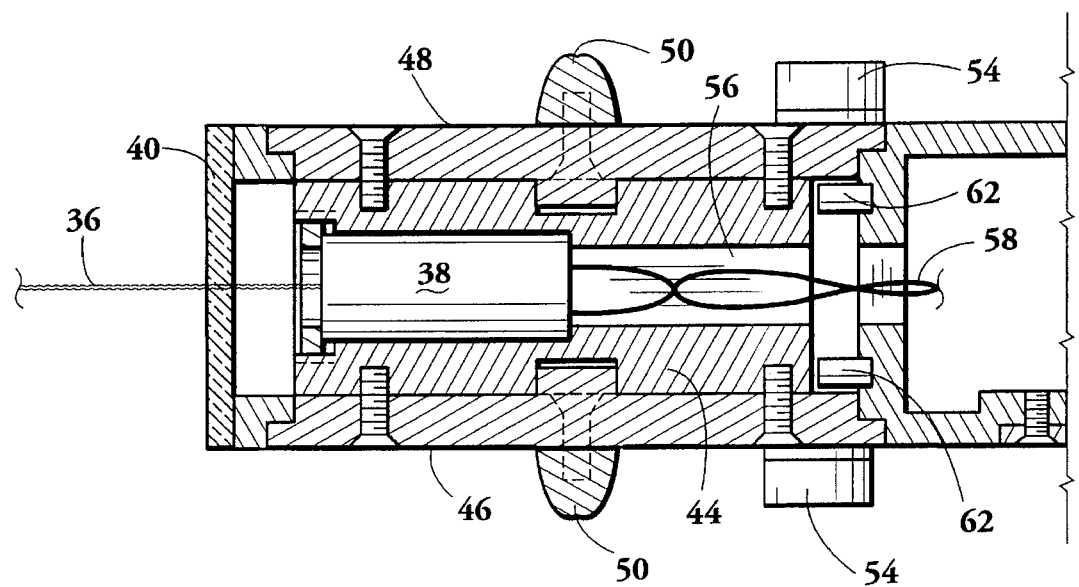
FIG. 5 is a partial section view taken along line 5—5 of FIG. 1, showing the laser horizontally positioned.
Figure 6:
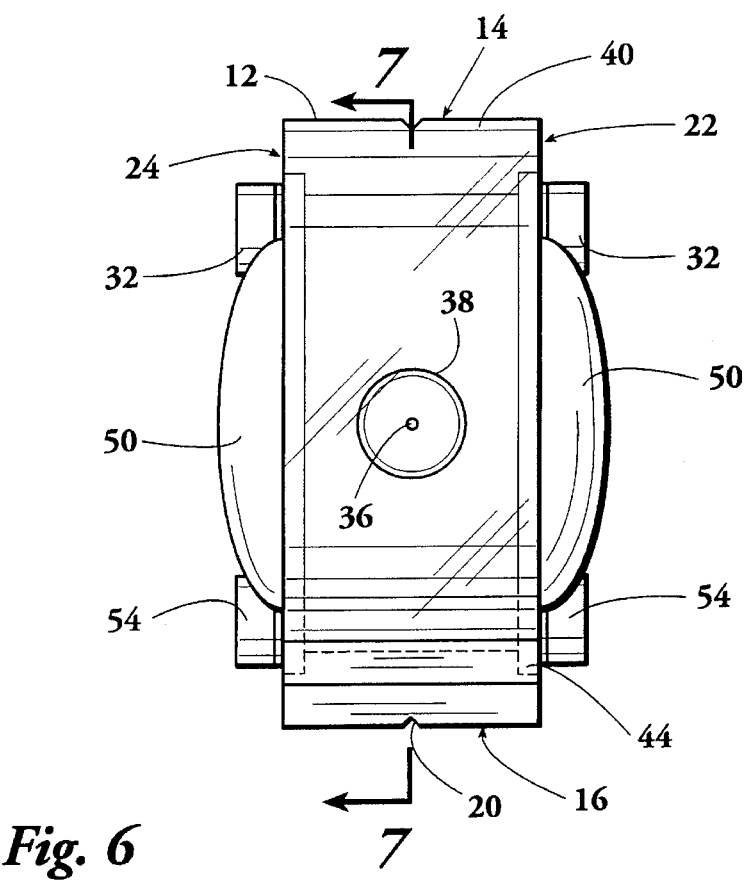
FIG. 6 is a right side elevation view taken along line 6—6 of FIG. 3.

As best illustrated in FIGS. 1 and 2, the present embodiment of the invention relates to a device 10 which is useful for leveling and squaring. The device 10 is particularly useful for squaring various angles on pipe flanges and fittings at a distance.

As shown in FIGS. 1–4, a preferred device 10 includes a generally rectangular-shaped level body 12 which is constructed of durable plastic, aluminum or other suitable materials known in the art. Top 14 and bottom 16 sides of the level body 12 are flat and provide the level body 12 with even surfaces for leveling therewith. The top 14 and bottom 16 sides each contain recessed magnetic strips 18 fixedly secured in position by suitable means, such as an epoxy adhesive. Various adhesives of this type are known to those skilled in the art, and are readily available.

Further, the top 14 and bottom 16 sides each contain a groove 20 to serve as reference lines for aligning the device 10 during operation, wherein the grooves 20 are in alignment with the longitudinal axis of the level body 12. The reference line is termed "horizontal" (0°) for descriptive purposes herein and should be read only in conjunction with the embodiment in the orientation illustrated.

In FIGS. 1 and 3, front 22 and back 24 sides of the level body 12 are shown, respectively. A first spirit vial 26 is fixedly mounted in a suitable opening in the level body 12, wherein the vial 26 is set transversely to the longitudinal axis of the level body 12. More specifically, the longitudinal axis of the vial 26 is perpendicular to the top 14 and bottom 16 of the level body 12. Wherefore, the vial 26 is visible from the front 22 and back 24 sides for plumbing therewith.

A circular vial housing 28 is movably mounted in a suitable opening in the level body 12, wherein a second spirit vial 30 is securely mounted in the rotatable housing 28 to provide a means for leveling and plumbing therewith. The housing 28 and vial 30 collectively rotate 360° in a medial plane defined between the front 22 and back 24 sides of the level body 12.

As illustrated in FIGS. 1 and 2, protruding vial set screws 32, which extend from the front 22 and back 24 sides, are threadably received into the level body 12, wherein the screws 32 partially extend over the vial housing 28. The screws 32 tighten against the housing 28, thereby holding the vial 30 in any desired position. Preferably, the level body 12 and vial housing 28 contain cooperative reference markings 34 as a means for determining the angle of vial 30 rotation with respect to the longitudinal axis of the level body 12. Hence, by loosening and tightening the set screws 32, the housing 28 and vial 30 are adjusted from either the front 22 or back 24 side for leveling and plumbing.

As shown in FIGS. 5–8, the device 10 includes a means for emitting a visible laser beam 36. Preferably, a self-contained laser module assembly 38 as is illustrated in U.S. Pat. No. 5,121,188, the disclosure of which is hereby incorporated by reference, is used as the means for emitting the visible laser beam 36. The laser module assembly 38 is generally positioned in the end of the level body 12. Additionally, it is obvious that any suitably sized laser assembly containing a diode laser, a means for producing a collimated laser beam, such as a lens, and other commonly associated components may be used as the means for emitting the laser beam 36.

The laser beam 36 exits the level body 12 via a transparent window 40 attached thereto, wherein the window 40 is adjacent the laser module assembly 38. The window 40 is made of a durable and transparent material known in the art, such as PLEXIGLAS or the like. As shown, the preferred window 40 substantially forms the end of the level body 12, thereby enabling the laser beam 36 to exit the level body 12 at various angles ranging from horizontal (0°) to 90° thereto, see FIGS. 1, 7 and 8. Further, the window 40 and level body 12 each contain somewhat L-shaped members 42 which abut to cooperatively and securely couple the window 40 with the level body 12.

Figure 7:
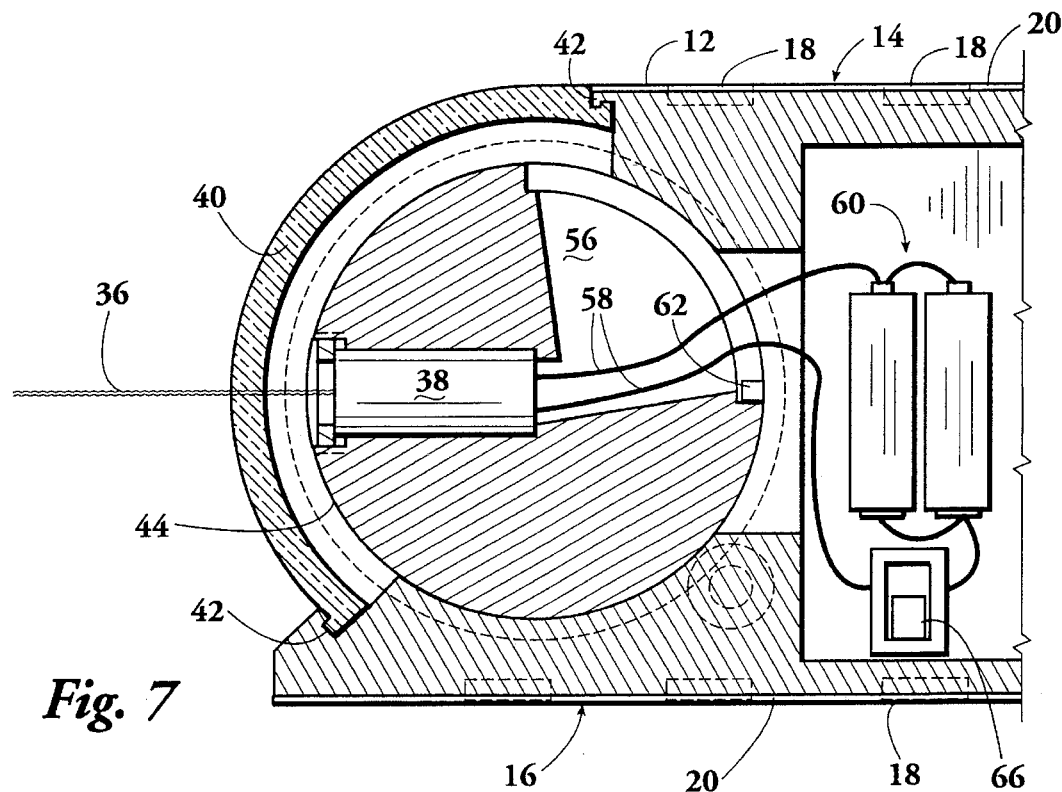
FIG. 7 is a partial section view taken along line 7—7 of FIG. 6, showing the laser horizontally positioned.
Figure 8:
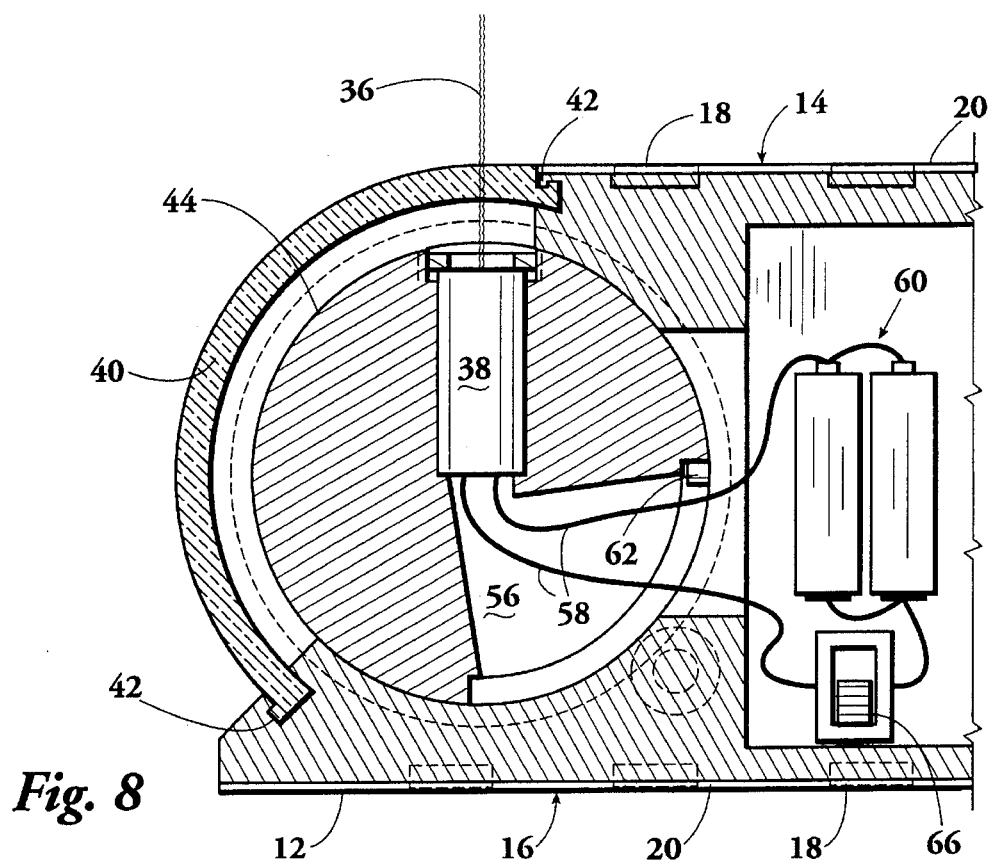
FIG. 8 is the view in FIG. 7, showing the laser rotated 90° from horizontal.

As seen in FIGS. 7 and 8, the laser module assembly 38 is fixedly mounted within a movable laser module housing 44. The module housing 44 is circular, whereby it is rotatably positioned in the level body 12. Preferably, the laser beam 36 is variably redirected to any desired angle from horizontal (0°) to 90° thereto, for example, 30°, 45°, 60° etc. Nevertheless, it is obvious that the device 10 could be constructed to allow the laser beam 36 to rotate beyond the range of 90°. Additionally, the window 40 is convexed, whereby the laser beam 36 generally always passes perpendicularly therethrough to prevent refraction thereof.

The laser module housing 44 includes a front cover plate 46 and a back cover plate 48 each being attached to the housing 44 using known screws or the like. Each plate 46, 48 has an outwardly extended control grip 50 attached with known screws or the like, wherein a person can rotate the connected laser module housing 44 by using the control grip 50. Thus, the housing 44 along with one of the cover plates 46, 48 and respective control grip 50 is generally referred to as a means for variably redirecting the laser beam 36.

The laser module assembly 38 is substantially enclosed within the laser module housing 44, whereby the module assembly 38 is stationary therein. The module housing 44 is rotatably mounted in a suitable opening in the level body 12, wherein the housing 44 is sufficiently fitted against the level body 12 to minimize excessive movement of the housing 44 therein. Hence, the perimeter of the module housing 44 slidably abuts the level body 12 to provide a secure movement therein.

The vial and module housings 28, 44 may contain suitable lubricants, which are known in the art, for providing acceptable movement within the level body 12. In addition, it is obvious that the housings 28, 44 may be movably positioned in the level body 12 by grooves such as those commonly found in bevel protractors.

As shown in FIGS. 1 and 3, the cover plates 46, 48 and level body 12 contain cooperative reference markings 52 which provide a means for determining the angle of the laser beam 36 with respect to the longitudinal axis of the level body 12. Obviously, the markings 52 may include any desired gradient of angle selections.

Moreover, as illustrated in FIGS. 1–4, protruding laser set screws 54, which extend from the front 22 and back 24 sides, are threadably received into the level body 12, wherein the screws 54 partially extend over the cover plates 46, 48. The set screws 54 tighten against the plates 46, 48 to hold the laser module housing 44 in a desired position. Wherefore, the laser beam 36 is rotatably redirected about a 90° range, via the control grip 50, and is set at a preferred angle using the set screws 54.

Referring to FIGS. 7 and 8, the laser module housing 44 has a wide-mouth opening 56 therein for receiving wires 58 from a power source 60, wherein the wires 58 provide positive and negative contacts to the laser module assembly 38. The opening 56 allows the module housing 44 to moves around the wires 58 as it is rotated; thus, the wires 58 do not inhibit or interfere with movement of the housing 44. Further, a stop member 62 is preferably integral with the level body 12 and extends into the opening 56 to engage the module housing 44 and prevent excessive rotation thereof.

Preferably, the power source 60 includes a battery or other 5 to 10 VDC power source. The power source 60 is contained within the level body 12 and is accessible through a door 64 attached with conventional screws, see FIG. 1.

Referring to FIGS. 1, 7 and 8, an on/off switch 66 is located on the level body 12 near the power source 60 and is attached inline with one wire 58 to control the supply of power that is delivered to the laser module assembly 38.

Figure 9:
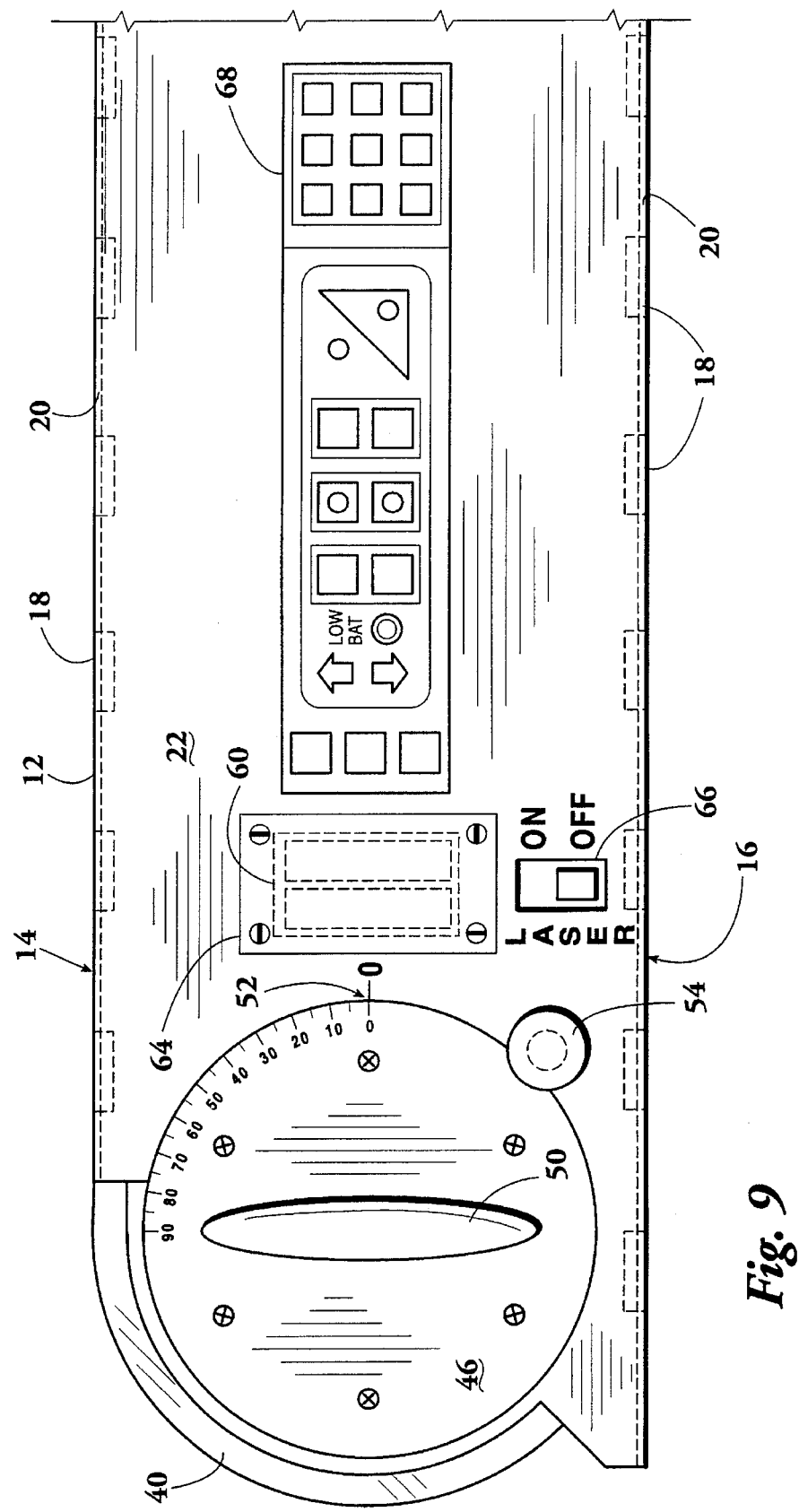
FIG. 9 is front elevation view illustrating an alternative embodiment of the invention which includes an electronic inclinometer.

As illustrated in FIG. 9, an alternative embodiment of the invention includes having an electronic inclinometer 68 to provide a means for leveling and determining orientation, wherein the inclinometer 68 replaces the second spirit vial 30 and vial housing 28. Further, the preferred inclinometer 68 is rectangular shaped and removable from the level body 12, wherein the inclinometer 68 may be used as a separate leveling device. A preferred inclinometer 68 is illustrated in U.S. Pat. No. 4,912,662, the disclosure of which is hereby incorporated by reference.

The previously described versions of the invention disclose a novel device 10 by combining the second vial 30 or inclinometer 68 with the adjustable laser module assembly 38, wherein the laser beam 36 is variably redirected and emitted therefrom. Thus, the laser beam 36 establishes a precise line, which is preferably adjustable from horizontal (0°) to 90°, for alignment and squaring uses.

The foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A device for leveling and squaring, comprising:
   a level body;
   a means for leveling coupled with said level body;
   a means contained within said level body for emitting a visible laser beam therefrom;
   a means for variably directing the laser beam, wherein the laser beam is variably redirected through a range of about 0° to about 90° from a longitudinal axis of said level body;
   a window coupled with said level body, said window having means for allowing the laser beam to exit said level body throughout said range of about 0° to about 90° from the longitudinal axis of said level body; and
   wherein said means for allowing the laser beam to exit said level body includes said window being curvedly extended through said range of about 0° to about 90° from the longitudinal axis of said level body.

2. The device as described in claim 1, wherein said means for variably directing includes:
   a housing rotatably positioned within said level body;
   wherein said means for emitting a laser beam is mounted in said housing; and
   wherein said housing has an opening that allows said housing to rotate about a wire connecting said means for emitting a laser beam to a power source.

3. The device as described in claim 2, further comprising a member extended within the opening of said housing for preventing excessive rotation of said housing.

4. The device as described in claim 1, wherein said means for emitting a laser beam includes a laser module assembly.

5. The device as described in claim 1, wherein said window forms a convexed portion of said level body.

6. The device as described in claim 1, wherein said window is coupled with said level body using L-shaped members.

7. A device for leveling and squaring, comprising:
   a level body;
   a means for leveling coupled with said level body;
   a means contained within said level body for emitting a visible laser beam therefrom;
   a housing rotatably positioned within said level body, said means for emitting a laser beam is mounted in said housing;
   wherein said housing variably redirects said means for emitting a laser beam;
   wherein said housing has an opening that allows said housing to rotate about a wire connecting said means for emitting a laser beam to a power source; and
   a means for allowing the variably redirected laser beam to exit said level body.

8. The device as described in claim 7, wherein said means for allowing the laser beam to exit said level body includes a window extended throughout a range of about 0° to about 90° from a longitudinal axis of said level body.

9. The device as described in claim 8, wherein said window is curvedly extended.

10. The device as described in claim 9, wherein said window forms a convexed portion of said level body.

11. The device as described in claim 7, wherein said means for allowing the laser beam to exit said level body includes a window extended from a portion of said level body near a longitudinal axis thereof to a portion of said level body about 90° from the longitudinal axis.

12. The device as described in claim 7, wherein said means for allowing said laser beam to exit said level body includes a window which is coupled with said level body using L-shaped members.

13. The device as described in claim 7, further comprising a member extended within the opening of said housing for preventing excessive rotation of said housing.

14. A device for leveling and squaring, comprising:
   a level body;
   a means for leveling coupled with said level body;
   a laser module assembly contained within said level body for emitting a visible laser beam therefrom;
   a housing rotatably positioned within said level body, said laser module assembly is mounted in said housing;
   wherein said housing variably redirects the laser beam through a range of about 0° to about 90° from a longitudinal axis of said level body;
   a window having means for allowing the laser beam to exit said level body throughout said range of about 0° to about 90° from the longitudinal axis of said level body; and
   wherein said means for allowing the laser beam to exit said level body includes said window being curvedly extended from a portion of said level body near the longitudinal axis to a portion of said level body about 90° from the longitudinal axis.

15. The device as described in claim 14, wherein said housing has an opening that allows said housing to rotate about a wire connecting said laser module assembly to a power source.

16. The device as described in claim 15, further comprising a member extended within the opening of said housing for preventing excessive rotation of said housing.

17. The device as described in claim 14, wherein said window forms a convexed portion of said level body.

18. The device as described in claim 14, wherein said window is coupled with said level body using L-shaped members.

* * * * *